United States Patent
Abu-Rabeah

(10) Patent No.: US 12,049,432 B2
(45) Date of Patent: Jul. 30, 2024

(54) GRANULE OF POLYHALITE AND PHOSPHATE ROCK AND A COMPACTION PROCESS FOR THE PRODUCTION THEREOF

(71) Applicant: ICL Europe Cooperatief U.A., Amsterdam (NL)

(72) Inventor: Khalil Abu-Rabeah, Beer Sheva (IL)

( * ) Notice: Subject to any disclaimer, the term of this patent is extended or adjusted under 35 U.S.C. 154(b) by 0 days.

(21) Appl. No.: 17/608,859

(22) PCT Filed: Jul. 10, 2021

(86) PCT No.: PCT/IL2021/050843
§ 371 (c)(1),
(2) Date: Nov. 4, 2021

(87) PCT Pub. No.: WO2022/043985
PCT Pub. Date: Mar. 3, 2022

(65) Prior Publication Data
US 2023/0271889 A1    Aug. 31, 2023

Related U.S. Application Data

(60) Provisional application No. 63/069,314, filed on Aug. 24, 2020.

(51) Int. Cl.
| | | |
|---|---|---|
| C05B 17/00 | (2006.01) |
| C05F 3/00 | (2006.01) |
| C05G 1/00 | (2006.01) |
| C05G 5/10 | (2020.01) |
| C05G 5/40 | (2020.01) |

(52) U.S. Cl.
CPC ............... *C05B 17/00* (2013.01); *C05F 3/00* (2013.01); *C05G 1/00* (2013.01); *C05G 5/10* (2020.02); *C05G 5/40* (2020.02)

(58) Field of Classification Search
None
See application file for complete search history.

(56) References Cited

U.S. PATENT DOCUMENTS

| | | | |
|---|---|---|---|
| 2,912,317 A | 11/1959 | Gloss | |
| 4,246,019 A * | 1/1981 | Sokolov | C05C 5/00 71/31 |
| 5,174,804 A * | 12/1992 | Rehberg | C05G 5/14 71/64.11 |
| 2006/0063674 A1* | 3/2006 | Morris | C05G 5/14 504/101 |
| 2020/0079704 A1* | 3/2020 | Yadav | C05C 9/005 |
| 2020/0095174 A1* | 3/2020 | Iyer | C05G 3/00 |

FOREIGN PATENT DOCUMENTS

| | | |
|---|---|---|
| CA | 630979 A | 11/1961 |
| CN | 105603179 A | 5/2016 |
| WO | 2020105055 | 5/2020 |
| WO | 2020105057 | 5/2020 |

OTHER PUBLICATIONS

Ahmed B. Albadarin, Granulated polyhalite fertilizer caking propensity, Powder Technology, vol. 308, p. 193-99, Feb. 15, 2017 (Year: 2017).
Extended European Search Report issued in App. No. EP21823170, dated Jul. 10, 2023, 7 pages.

* cited by examiner

*Primary Examiner* — Wayne A Langel
(74) *Attorney, Agent, or Firm* — AlphaPatent Associates Ltd.; Daniel J. Swirsky

(57) ABSTRACT

According to some embodiments, there is provided herein a granule comprising polyhalite and phosphate rock, in a ratio of between 30:70 to 70:30, respectively.

10 Claims, No Drawings

GRANULE OF POLYHALITE AND PHOSPHATE ROCK AND A COMPACTION PROCESS FOR THE PRODUCTION THEREOF

FIELD OF THE INVENTION

The present invention relates to the field of fertilizers, specifically to production of compacted polyhalite and phosphate rock.

BACKGROUND OF THE INVENTION

To grow properly, plants need nutrients (nitrogen, potassium, calcium, zinc, magnesium, iron, manganese, etc.) which normally can be found in the soil. Sometimes fertilizers are needed to achieve a desired plant growth as these can enhance the growth of plants.

This growth of plants is met in two ways, the traditional one being additives that provide nutrients. The second mode by which some fertilizers act is to enhance the effectiveness of the soil by modifying its water retention and aeration. Fertilizers typically provide, in varying proportions, three main macronutrients:
Nitrogen (N): leaf growth;
Phosphorus (P): Development of roots, flowers, seeds, fruit;
Potassium (K): Strong stem growth, movement of water in plants, promotion of flowering and fruiting;
three secondary macronutrients: calcium (Ca), magnesium (Mg), and Sulphur (S); micronutrients: copper (Cu), iron (Fe), manganese (Mn), molybdenum (Mo), zinc (Zn), boron (B), and of occasional significance there are silicon (Si), cobalt (Co), and vanadium (V) plus rare mineral catalysts.

The most reliable and effective way to make the availability of nutrients coincide with plant requirements is by controlling their release into the soil solution, using slow release or controlled release fertilizers.

Both slow release fertilizers (SRF) and controlled release fertilizers (CRF) supply nutrients gradually. Yet, slow release fertilizers and controlled release fertilizers differ in many ways: The technology they use, the release mechanism, longevity, release controlling factors and more.

Solid fertilizers include granules, prills, crystals and powders. A prilled fertilizer is a type of granular fertilizer that is nearly spherical made by solidifying free-falling droplets in air or a fluid medium. Most controlled-release fertilizers (CRFs) used in commercial nurseries are prilled fertilizers that have been coated with sulfur or a polymer. These products have been developed to allow a slow release of nutrients into the root zone throughout crop development.

Polyhalite is an evaporite mineral, a hydrated sulfate of potassium, calcium and magnesium with formula: $K_2Ca2Mg(SO_4)_4 \cdot 2H_2O$. Polyhalite is used as a fertilizer since it contains four important nutrients and is low in chloride:
48% $SO_3$ as sulfate
14% $K_2O$
6% MgO
17% CaO

SUMMARY OF THE INVENTION

According to some embodiments, there is provided herein a granule comprising polyhalite and phosphate rock, in a ratio of between 30:70 to 70:30, respectively, preferably between 60:40-40:60.

According to some embodiments, the strength of the granule may be at least 0.8 Kg/Granule without drying, preferably at least 1 Kg/Granule without drying.

According to some embodiments, the granule may further include a binder selected from the group of starch, molasses, manure bentonite, sodium silicate, lignosulfonates, venasses, hydrated lime, bitumen, Portland cement, clay, cellulose gum, sucrose, water, water glass, cements, Fly Ash, Potassium and Sodium Silicate, MgO, CaO, Geo-polymers, oils and waxes and the like, or a combination thereof.

According to some embodiments, the binder may preferably be starch, lignosulphonate, Molasses, Manure and/or Venasses.

According to some embodiments, there is provided herein a process for the compaction of Polyhalite with Phosphate rock comprising:
crushing or screening of the polyhalite to less than 2 mm;
crushing or screening of the phosphate rock to less than 2 mm;
mixing said polyhalite with said Phosphate rock in a mixer to yield a mixture;
compacting said mixture in a compactor to yield masses;
crushing said masses in a crusher to yield particles; and
screening said particles in a screener to yield different particles in three different sizes:
oversized particles which undergo a second crushing process and are retuned to screener for screening;
undersized particles which are transferred to mixer for further mixing with the feed; and
desired size granular particles which are transferred to a polish screener.

According to some embodiments, the process may further include adding a binder to the mixture prior to compacting the mixture.

According to some embodiments, the ratio between of Polyhalite and phosphate rock may be 58:38, respectively.

DETAILED DESCRIPTION OF THE INVENTION

According to some demonstrative embodiments, there is provided herein a fertilizer granule including polyhalite and phosphate rock, in a ratio of between 30:70 to 70:30, respectively.

According to some embodiments, the granule of the present invention may contain $K_2O$, P, $SO_4$, Mg and ,Ca, yet the unique combination of Polyhalite and phosphate rock may supply the plants with essential macro-elements such as K, P Ca, Mg and S via a single granule.

According to some embodiments, both the Polyhalite and the Phosphate rock are both used naturally in the granule without the need to undergo any chemical modification, for example, this allows for better plant growth and obviates the need for further industrial processing.

According to some embodiments, the specific use of phosphate rock together with Polyhalite enables, e.g., due to the existence of carbonate, the effective use of the granule of the present invention in acidic soils.

However, although both Polysulphate and Phosphate rock may useful for the proper growth of a plant, they are practically un-mixable due to the fact that each one or both of them have to be crushed or enlarged to the same range of particles sizes, e.g., to enable homogenous properties and/or prevent electrical repelling forces to take place when particle sizes differ.

According to some embodiments, the granule may contain $K_2O$, P, $SO_4$, Mg and ,Ca, According to some embodiments, there is provided herein a fertilizer granule comprising Polyhalite and Phosphate rock and optionally a binder; wherein the ratio between Polyhalite and Phosphate rock may be 30:70 to 70:30, respectively.

According to some embodiments, there is provided herein a process for the compaction of Polyhalite with a Phosphate rock which may include: crushing or screening (or both) of the polyhalite to less than <2 mm crushing or screening (or both) of the phosphate rock to less than 2 mm. Mixing the polyhalite with a Phosphate rock and optionally a binder in a mixer to yield a mixture. Compacting the mixture in a compactor to yield masses; crushing masses in a crusher to yield particles; and screening the particles in a screener to yield different particles in three different sizes: oversized particles which undergo a second crushing process and are retuned to screener for screening, undersized particles which are transferred to mixer for further mixing with the feed, and desired size granular particles which are transferred to a polish screener.

The mixture for the compactor contains 40-60% to 60-40% of Polyhalite and phosphate rock, respectively.

According to some embodiments, the mixing may be performed in a blade blender and/or any other suitable devise capable of having a s mixing that creates a swirling motion for a perfect homogenization and a high blending precision, e.g., a Ploughshare® Mixer.

According to some embodiments, the compaction be a wet compaction.

According to some embodiments, the compaction process may include the addition of a binder 1-5% w/w.

According to some embodiments, the binder may include but not limited : for example, organic or inorganic binders, such as, starch, molasses, manure bentonite, sodium silicate, lignosulfonates, venasses, hydrated lime, bitumen, Portland cement, clay, cellulose gum, sucrose, water, water glass, cements, Fly Ash, Potassium and Sodium Silicate, MgO, CaO, Geo-polymers, oils and waxes and the like, or a combination thereof.

According to some demonstrative embodiments, the compaction process may include the following steps:

Mixing Polyhalite with phosphate rock at a ratio between 30:70 to 70:30 w/w, respectively, to yield a mixture. According to some embodiments, micronutrients may be added to the mixture, and water may be added between 0.5-4% w/w , preferably 3% w/w.

According to some embodiments, the process may include adding organic or inorganic binder between 1-5% w/w preferably and more preferable between 2-4% w/w.

According to some embodiments, the mixture may be heated to a temperature between 80-180° C., preferably 160° C.

Feeding the mixture into a compactor to provide compacted flakes;
Grinding of the flakes;
Sieving of the grinded flakes; and
After sieving there are three types of yield:
1. Desired sized flakes between 12-33 mm thickness, S.G. between 1.9 to 2.4 g/cm3. According to some embodiments, the desired size of the flakes (also referred to herein as "particles" or "granules" or "the final product") is between 1-6 mm, most preferably between 2-4 mm.
2. Oversized (OS) flakes—are returned to the grinding stage, e.g., between 4-25% w/w of the total resulting flakes.
3. Undersized (US) flakes—are recycled to the mixture for compaction, e.g., between 10 to 80% w/w of the total flakes.

In the dry process, optionally a binder may be added in a concentration of between 0.01-7% w/w, preferably between 1-5% w/w, most preferably between 2-4% w/w.

According to some embodiments, the final product may submitted to post-treatment, including, for example, oil or derivatives or inorganic materials that may be added to the resulting granules, e.g., to improve the rheology, protect the granules against weather or abrasion of the product and diminish dust formation. Polishing the granules or Coating. The resulting flakes/granules may be glazed and further coated with a suitable coating.

For example, the coatings may include biodegradable coatings, sustained release coatings, controlled release coatings, oily coatings, wax coatings.

The compacting process may include the following steps:
1. Mixing materials—Poly halite, Phosphate Rock in 200 lit mixer
2. Adding binder
3. Adding water
4. Compacting using a compactor diameter 600 mm, width 145 mm. Working force 110 KN/cm. Roll velocity 6 rpm.
5. Crushing using hammer mill 9.
6. Screening
7. Drying the granule between 2-5 mm
8. Recycling-80%
9. Analysis. All analyses conducted according to the standard procedure

Example 1

60% polyhalite+40% phosphate rock
Strength of granule immediately after production without drying 1 Kg granule.

Example 2

59% polyhalite+40% phosphate rock+1% water
Strength of granule immediately after production without drying 1.5 Kg granule

Example 3

58% polyhalite+39% phosphate+3% water.
Strength of granule immediately after production after drying at 150-degree 1.3 Kg granule.
The abrasion −12 mesh after production without drying 73%.
Eco dust after production without drying 1.5%.
Strength of granule after 45 days without drying 1.2 Kg granule.
Strength of granule after 45 days and drying at 150-degree 2.6 Kg granule.
The abrasion −12 mesh after 45 days and drying at 150 degree 27%.
Eco dust after 45 days and drying at 150 degree 2.6%

Example 4

57% polyhalite+37% phosphate rock+3% starch+3% water
Strength of granule immediately after production without drying 1.3 Kg granule.
Strength of granule after 45 days 1.34 Kg without drying.
Strength of granule after 45 days and drying at 150-degree 2.6 Kg granule.

Example 5

57% polyhalite+38% phosphate rock+3% lignosulphonate+2% water.

Strength of granule immediately after production without drying 1.5 Kg granule.
Strength of granule after 45 days 1.2 Kg without drying.
Strength of granule after 45 days and drying at 150-degree 1.9 Kg granule.

Example 6

58% polyhalite+38% phosphate rock+3% Molasses+1% water.
Strength of granule immediately after production without drying 1.5 Kg granule.

Example 7

57% polyhalite+37% phosphate rock+4% Lignosulphonate+2% water.
Strength of granule immediately after production without drying 1.4 Kg granule.
Strength of granule after 45 days without drying 1 Kg granule.
Strength of granule after 45 days and drying at 150 degree d 2.3 Kg granule.

Example 8

58% polyhalite+37% phosphate rock+3% Manure+2% water.
Strength of granule after 45 days without drying 1.3 Kg granule
Strength of granule after 45 days and drying at 150-degree 1.8 Kg granule.

Example 9

58% phosphate rock+38 polyhalite+1% Venasses+3% water.
Strength of granule after 45 days without drying 0.8 Kg. granule
Strength of granule after 45 days and drying at 150-degree 1.7 Kg granule.

Example 9

58% phosphate rock+38 polyhalite+1% Venasses+3% water.
Strength of granule after 45 days without drying 0.8 Kg. granule
Strength of granule after 45 days and drying at 150-degree 1.7 Kg granule.

Example 10

68% phosphate rock+28 polyhalite+1% Venasses+3% water.
Strength of granule after 45 days without drying 1 Kg. granule
Strength of granule after 45 days and drying at 150-degree 1.9 Kg granule.

Example 11

50% polyhalite+50% phosphate rock
Strength of granule immediately after production without drying 1.1 Kg granule.

While the invention has been described with respect to a limited number of embodiments, it will be appreciated that many variations, modifications and other applications of the invention may be made.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove.

The invention claimed is:

1. A granule comprising polyhalite and phosphate rock, in a ratio of between 30:70 to 70:30, respectively, wherein said granule is prepared from polyhalite particles having a size of less than 2 mm and from phosphate rock particles having a size of less than 2 mm.

2. The granule of claim 1, further comprising a binder selected from the group consisting of starch, molasses, manure bentonite, sodium silicate, lignosulfonates, venasses, hydrated lime, bitumen, Portland cement, clay, cellulose gum, sucrose, water, water glass, cements, Fly Ash, Potassium and Sodium Silicate, MgO, CaO, Geo-polymers, oils, and waxes.

3. The granule of claim 2, wherein said binder is starch, lignosulphonate, Molasses, Manure and/or Venasses.

4. The granule of claim 1, wherein said ratio is between 60:40 to 40:60.

5. The granule of claim 4, wherein said Polyhalite and said Phosphate rock are both used naturally without undergoing any chemical modification.

6. The granule of claim 1, wherein the strength of the granule is at least 0.8 Kg/Granule without drying.

7. The granule of claim 1, wherein the strength of the granule is at least 1 Kg/Granule without drying.

8. A process for the compaction of Polyhalite with Phosphate rock comprising:
  crushing or screening of the polyhalite to less than 2 mm;
  crushing or screening of the phosphate rock to less than 2 mm;
  mixing said polyhalite with said Phosphate rock in a mixer to yield a mixture;
  compacting said mixture in a compactor to yield masses;
  crushing said masses in a crusher to yield particles; and
  screening said particles to yield different particles in three different sizes:
  oversized particles which undergo a second crushing process and are retuned to screener for screening;
  undersized particles which are transferred to mixer for further mixing with the feed; and
  desired size granular particles in a size of between 1-6 mm which are transferred to a polish screener.

9. The process of claim 8, further comprising adding a binder to said mixture prior to compacting said mixture.

10. The process of claim 8, wherein the ratio between of Polyhalite and phosphate rock is 58:38, respectively.

* * * * *